106-86 CROSS REFERENCE EXAMINER

United States Patent Office 2,892,240

Patented June 30, 1959

2,892,240

FLY ASH

Charles A. Frankenhoff, Scarsdale, N.Y.

No Drawing. Application June 8, 1955
Serial No. 514,130

2 Claims. (Cl. 25—157)

This invention relates to an inexpensive and effective filter aid for use in filtration of turbid liquids.

The application is a continuation in part of my application Serial No. 136,243 filed December 31, 1949, now abandoned. The copending application describes a filter aid consisting of fly ash of such critical particle size as to pass substantially completely through a 100-mesh screen and to the extent of at least 63% through a 325-mesh screen in a wet screening test.

I have now confirmed conclusions previously reported in the copending application in the filtration of additional samples of a city water supply. I have also discovered means for processing the fly ash so that it may be used successfully with a great variety of liquids including, for example, raw sugar solutions in sugar refining operations.

The means for improving the filtration characteristics of fly ash include calcining the fly ash in manner to utilize effectively the water solubles of the fly ash itself as the flux during the calcining and attendant light sintering operation.

Briefly stated, my invention comprises fly ash filter aid of the mesh size stated. In the embodiment giving greatly increased rate of flow, the invention comprises the process of and the product resulting from moistening the fly ash with a volatile solvent for metal salts present in the fly ash, drying the moistened material, and subsequently calcining the dried material.

As the volatile solvent, water is the one that I use.

Using the moistening step followed by drying and calcining, I obtain a filter aid of increased rate of filtration that varies somewhat with the particular liquid being filtered but is large in all cases. When potable water is filtered at a pressure of 2 lbs., I obtain, with the moistened and calcined fly ash, rates of filtration 2–5 times those obtained with the same fly ash before being moistened and calcined. With 60° Brix raw sugar solutions and 1% of my new filter aid, I obtain rates up to 3 or more times the rate with natural diatomaceous earth filter aid used in the proportion of 0.5%.

Fly ash which I use is from burning pulverized coal, usually bituminous or semibituminous or mixtures thereof. It consists largely of fused, generally spherical particles or beads. It contains alumina, iron, alkaline earth metals, alkali metals, and other metals associated with large amounts of silica, as in the form of insoluble silicates or oxides but present to appreciable extent also as soluble salts or other compounds. Water soluble material was determined in representative fly ash material by stirring with water at a temperature of about 100° C. for several hours, filtering, and evaporating the filtrate to dryness, and weighing the residue. The percentage of water soluble material so determined was more than 1% and usually about 1.5%–3% of the weight of the fly ash.

Once having observed the effect of the added water, various theories may be advanced to explain the mechanism by which the water functions. I consider it to be as follows:

When I moisten the fly ash with water and then heat the material, a certain proportion of the metal compounds dissolve. As the water later evaporates, as at the start of or in advance of the calcining operation, this dissolved material redeposits where the water finally disappears as vapor, i.e., on the surfaces of the beads. Here the salts are concentrated for partial fluxing of the siliceous surfaces during the ensuing calcination. The result at red heat is a light sintering action on contacting surfaces of adjacent beads of the fly ash, so as to give small agglomerates. These, in filtration, build a more porous cake with freer filtration properties than are obtained with the original fly ash. This sintering also causes water soluble material to form silicates of such high silica ratio as to be insoluble or to form other slag like, insoluble product.

The proportion of water used to moisten the surfaces of the particles of the fly ash before calcination is suitably 7.5–25 parts of water and ordinarily 10–15 parts for 100 of the fly ash. When the proportion of water is too low, then all the fly ash surfaces are not moistened and the soluble materials of the fly ash are not brought satisfactorily to the surface of the particles by solution in water and subsequent deposition when the water evaporates. When the proportion of water is larger than required, there is unnecessary evaporation without offsetting advantage. A large excess of water washes the solubles away from the surfaces of individual particles, particularly if the water is present in amount to flow or settle in the mass of fly ash.

The water is mixed into the fly ash in any manner that is convenient for wetting the fly ash uniformly throughout. Thus I may spray the water upon the fly ash while it is being tumbled, as in a pug mill or other mixer or in the charging end of a rotary kiln in which the calcination is to be subsequently effected. In any case, the water is admixed at a temperature below its boiling point.

The calcination is made at a red heat to cause insolubilizing of an originally soluble material and a light sintering action. Suitable temperatures are 1600°–2200° F. Operation within the range 1800°–2000° F. decreases the hazard of underheating or, on the other hand, overheating and bonding the whole into a hard mass that is not disintegrable to a light weight powder adapted to build a porous filter cake.

The time of calcination may be short. A few minutes at the selected maximum temperature throughout the entire mass is sufficient. Ordinarily I hold the charge for 10–60 minutes, to make certain that all parts of the mix are at about the same temperature level.

The invention will be further illustrated by description in connection with the following specific examples of the practice of it. In these examples and elsewhere herein, proportions are expressed as parts by weight.

*Example 1*

In this example, the fly ash is not calcined.

Two different specimens of fly ash, freed by screening from agglomerates or other particles of size retained on a 100-mesh screen and of size to pass to the extent of at least 63% through 325-mesh, were used as the filter aids. A city water supply was the liquid to be filtered.

The fly ash specimens, by wet screen test, gave the following results:

| Screen Size | Percent of Total Sample | |
|---|---|---|
| | Fly Ash No. 1 | Fly Ash No. 2 |
| On 200 mesh | 18 | 8 |
| Through 200 on 325 | 19 | 11 |
| Through 325 | 63 | 81 |

The fly ash was added to the city water supply at the rate of 1 oz. per gallon of water and the whole then pumped into a pressure filter of filtering area 0.5 sq. ft. The filtrate was again mixed with 1 oz. of fly ash and the transfer to the filter then repeated. This cycle of operations was continued until a total of 8 oz. of the filter aid had been accumulated on the filter leaf of the size stated.

For a comparison of filtration rates, there was used, in an exactly similar operation, a commercial filter aid known as "Standard Supercel" which is diatomaceous earth that has been calcined in milled condition without the addition of a flux. Both the fly ash and the standard Supercel initially gave a flow rate through the filter equal to the capacity of the pump. As the cake built up in thickness the flow rate began to slow down. By the time 6 oz. of the filter aid in each case had been transferred to the filter, the fly ash showed a filtration rate of 170 gals, per sq. ft. per hour. Under the same condition and at the same pressure, the standard Supercel showed a rate of 160 gallons.

The run reported above was made with the fly ash shown in the screening test as sample No. 2. In a similar test with the fly ash sample No. 1, there was again obtained about the same flow rate as with sample No. 2 when 6 oz. of the fly ash had been transferred to the filter.

*Example 2*

A sample of fly ash containing approximately 4% of residual fuel, as measured by loss on ignition, was tested for filtration with a potable water as outlined under Example 1. In this test the fly ash was mixed with the water and the suspension pumped through a filter press until the amount of the fly ash transferred to the filter leaf corresponded to 11 pounds for 100 sq. ft. of filter area. Then the pressure was maintained at 2 pounds per sq. in. The rate of filtration at that stage was 2 gallons per sq. ft. of filter area per minute.

A sample of the same fly ash was calcined in an open crucible at 1600° F. for 22 minutes. The filtration rate, with the same application in pounds per sq. ft. as before, and at 2 lbs. pressure p.s.i. was now 2.5 gallons. Also clarity was obtained in the filtrate, whereas with the uncalcined fly ash the filtrate in this particular test and with this grade of fly ash was not clear.

Then a sample of the same original fly ash was mixed with 10% by weight of water and the moist mixture calcined at 1600° F. The filtration rate now was 6.4 gallons and the clarity was excellent, beginning shortly after the start of the filtration test.

The same calcinations were repeated in covered vessels so as to restrict the air access to the material during the calcination. Rates were slower than with the material calcined in the open crucible but the speed of arriving at a clear filtrate was somewhat faster than with the calcinations with free access of air, the effect on the clarity of excluding air being particularly notable with the fly ash which was not moistened before calcination.

*Example 3*

The procedure of Example 2 was followed except that the fly ash used contained residual fuel in the amount of 32% and the temperature of calcination was 1700° F. for 10 minutes.

The results of the various calcination tests with this fly ash, variously processed, are as follows:

| Processing of Fly Ash | | | Filtrate at 2 p.s.i. Gal./Sq. Ft./Min. | Speed of Arriving at Clarity of Filtrate |
|---|---|---|---|---|
| 10% Water Added? | Calcined 1,700° F.? | Air Admitted During Calcination? | | |
| No | No | (as rec'd) | 1.15 | Slow. |
| No | Yes | Yes | 6.4 | Quick. |
| Yes | Yes | Yes | 11.3 | Quick. |
| No | Yes | No | 3.8 | Quick. |
| Yes | Yes | No | 9.0 | Quick. |

*Example 4*

Fly ash of ignition loss 32% was moistened with 20% of its weight of water. The water was added slowly and stirred into the fly ash uniformly, so that the surfaces of the individual particles were moistened by the water. The moistened sample, after standing for 30 minutes, was gradually raised in temperature in a muffle furnace. After a period of time, estimated at approximately half an hour, the water was evaporated from the fly ash. The temperature was then raised to a maximum of 1940° F. after about two hours' heating. This temperature was maintained for another hour, to insure substantial uniformity of temperature throughout the mass.

During this calcination access of air to the material being calcined was restricted by a cover on the crucible in which the fly ash was heated. After the calcination was completed, the crucible and contents were cooled while still covered so as to avoid oxidation to any great extent during the cooling period.

The calcined material was found to be in a mass that shows the effect of very light sintering, to the extent only that the mass was not crisp and crumbled immediately under the lightest finger pressure.

The calcined material so made was brushed with a small paint brush through a 60-mesh screen. It was tested for filtration rate with 60% raw sugar solution at 85° C., at pressure rising to 40 p.s.i. The proportion of the filter aid was 1% of the raw sugar on the solids basis.

In a 20-minute filtration cycle the fly ash, calcined after being moistened, showed an overall volume of filtrate 88% of that obtained with flux calcined diatomaceous earth under similar conditions, except that the flux calcined diatomaceous earth was used in the proportion of 0.5% of the weight of the raw sugar. The clarity of filtrate obtained with the calcined moistened fly ash was very slightly inferior to the clarity obtained with the flux calcined diatomaceous earth during the first part of the filtration cycle but, after 10 minutes' filtration, the clarity became somewhat superior to that obtained with the flux calcined diatomaceous earth.

This rate, 88% of that with flux calcined diatomaceous earth, corresponds to about 300%–400% of that with the said earth in uncalcined condition.

In testing for water solubles before and after calcining, 1 g. samples were boiled with 100 ml. of distilled water, filtered, and 1 ml. of 10% sodium carbonate solution added to 10 cc. of each filtrate. Sample descriptions and observations follow:

| Filtrate from— | Ppt. with $Na_2CO_3$ |
|---|---|
| Fly ash (32% I.L.) as rec'd | Heavy. |
| Same, calc. 1940° F | Light. |
| Same + 20% water, calc. 1940° F | Very light. |

In addition to the use as a filter aid, the fly ash may be used, either as received, as calcined, or in the form of filter cakes (formed by use of it in purifying water, sugar solutions or the like) as an enrichment for soils. The fly ash contains various rare elements in about the proportion at which they are stored in trees or other vegetation from which the coal has originated. For such enrichment, I supply the fly ash to the soil and spread it thereon or use the waste filter cakes from filtrations of materials that are non-toxic to plants and non-injurious to soils.

Also I may use fly ash to particular advantage as an admix to Portland cement before the latter is ground. For this purpose the fly ash is introduced into the cement clinker at a temperature below that of fluxing of the fly ash, as at a temperature below 1800° F. The thus mixed fly ash and Portland cement are then ground to cement fineness. This grinding fractures the beads of fly ash and increases the specific surface area.

It will be understood that it is intended to cover all changes and modifications of the examples of the invention herein chosen for the purpose of illustration which do not constitute departures from the spirit and scope of the invention.

I claim:

1. A process of preparing a filter aid from powdered fly ash having a substantial content of water-soluble material, which comprises moistening the fly ash with a sufficient amount of water within the range from 7.5 to 25 parts by weight per 100 parts of the fly ash to moisten the fly ash and bring water-soluble materials therein to the surface, but insufficient to form nodules, heating the resulting mixture at an elevated temperature to cause solution of the water-soluble material in the water, drying the mixture at an elevated temperature, and then heating the dried material at a temperature within the range from about 1600 to about 2200° F. for a sufficient time to effect light sintering and to bond the whole into a fragile mass that is readily disintegratable on mere handling and disintegrating the fragile mass to a light weight powder which is suitable for building a porous filter cake.

2. A powdered filter aid prepared by the process of claim 1.

References Cited in the file of this patent

UNITED STATES PATENTS

| | | |
|---|---|---|
| 1,756,906 | Miketta | Apr. 29, 1930 |
| 1,916,417 | Coulson | July 4, 1933 |
| 1,944,007 | Hobart | Jan. 16, 1934 |
| 2,330,211 | Haney | Sept. 28, 1943 |
| 2,544,752 | Gelbman | Mar. 13, 1951 |
| 2,570,131 | Koupal | Oct. 2, 1951 |
| 2,576,565 | Brown | Nov. 27, 1951 |
| 2,627,642 | Osborne | Feb. 10, 1953 |

FOREIGN PATENTS

| | | |
|---|---|---|
| 516,645 | Great Britain | Jan. 8, 1940 |

OTHER REFERENCES

"Agglomeration," Chemical Engineering, vol. 58, No. 10, October 1951, pp. 161 to 174.

"Properties of Cements and Concrete Containing Fly Ash," report to Research Corp., New York; by R. E. Davis and R. W. Carlson.